United States Patent [19]
Jatnieks

[11] Patent Number: 6,161,764
[45] Date of Patent: Dec. 19, 2000

[54] ENHANCED ECONOMIZER CONTROLLER

[75] Inventor: Girts U. Jatnieks, Minneapolis, Minn.

[73] Assignee: Honeywell International Inc., Morristown, N.J.

[21] Appl. No.: 09/235,443

[22] Filed: Jan. 22, 1999

[51] Int. Cl.[7] .................................................. F24F 7/00
[52] U.S. Cl. ...................... 236/49.3; 165/249; 165/251; 454/229; 454/256
[58] Field of Search .................... 165/248, 249, 165/251; 454/75, 256, 229; 236/49.3

[56] References Cited

U.S. PATENT DOCUMENTS

| | | |
|---|---|---|
| 3,979,922 | 9/1976 | Shavit . |
| 3,982,583 | 9/1976 | Shavit . |
| 4,109,704 | 8/1978 | Spethmann . |
| 4,347,712 | 9/1982 | Benton et al. . |
| 4,362,026 | 12/1982 | Miller .................................... 62/176 E |
| 4,379,484 | 4/1983 | Lom et al. . |
| 4,437,391 | 3/1984 | Eguchi et al. ........................... 98/2.01 |
| 4,570,448 | 2/1986 | Smith . |
| 4,916,913 | 4/1990 | Narikiyo ..................................... 62/81 |
| 5,261,596 | 11/1993 | Tachibana et al. ..................... 236/49.3 |
| 5,590,830 | 1/1997 | Kettler et al. .......................... 236/49.3 |
| 5,626,288 | 5/1997 | Huber .................................... 236/49.6 |
| 5,775,406 | 7/1998 | Ghitea et al. .......................... 165/11.1 |
| 5,971,067 | 10/1999 | Rayburn et al. ......................... 165/217 |

OTHER PUBLICATIONS

Wacker, "Economizer Savings Study", published in *Ashrae Transactions* vol. 5, Part 1 (1989).

Brown, "Maximize Energy Saving With Economizer Controls", published in *The Air Conditioning, Heating and Refrigeration News* (1996).

Honeywell Product Data brochure 63–8491, "The Cool Solution Honeywell Solid–State Economizer Systems" (Jul. 1996).

Honeywell Product Data brochure 63–2528, "W6210A,D and W7210A,D Solid State Economizer Logic Module" (Sep. 1996).

Balmer and Brown, "A Computer Study of the Energy Savings from Using Various Economizer Changeover Strategies in a Retail Store" (Feb. 1997).

Honeywell Product Data brochure 63–2544, "W6215, W7215, W7460 Economizer™ Logic Module for Ventilation Control" (Apr. 1998).

Honeywell publication 63–8588, "Fresh Air Economizer™ Systems" (May 1998).

Honeywell publication 63–8586, "Economizer™ Systems Quick Selection Guide" (Jun. 1998).

Honeywell publication 63–8594, "Design and Application Guide for Honeywell Economizer Controls" (Jun. 1998).

Honeywell publication 63–7036, "Solid State Economizer™ and Sensor Based Demand Control Ventilation Technical Literature Compilation" (Jul. 1998).

Honeywell publication 63–9058, "Research Finds Economizer Plus Demand Control Ventilation Delivers Highest Energy Savings" (Jun. 1998).

*Primary Examiner*—Corrine McDermott
*Assistant Examiner*—Marc Norman
*Attorney, Agent, or Firm*—Charles L. Rubow

[57] ABSTRACT

An enhanced controller for an air conditioning system incorporating mechanical cooling equipment and an economizer, the enhanced controller including circuits for producing signals indicative of commanded changes in temperature of air admitted into the air conditioned space and of a non-temperature parameter, such as carbon dioxide concentration, of air within the space. The signals are supplied to a logic circuit which produces a ventilation damper control signal based on which of the temperature and non-temperature parameters requires greater change. Freeze protection, and maximum and minimum damper position circuits override the basic damper control signal to avoid excessively low space temperatures and to provide air exchange limits.

16 Claims, 5 Drawing Sheets

| Input Terminal Contacts | | | | Outputs | | | |
|---|---|---|---|---|---|---|---|
| Purge | Air Change | Shut Down | Actuator Control Signal | Unit Control Relay Contacts | Indoor Fan Relay Contacts | Exhaust Fan Relay Contacts |
| Open | Open | Open | Normal Control | Closed | Closed | — |
| Open | Open | Closed | Full Closed | Open | Open | Open |
| Open | Closed | Open | Full Open | Open | Closed | Closed |
| Open | Closed | Closed | Full Closed | Open | Open | Open |
| Closed | — | — | Full Closed | Open | Open | Closed |

Fig. 3

ENHANCED ECONOMIZER CONTROLLER

FIELD OF THE INVENTION

The invention disclosed herein relates generally to apparatus for coordinately controlling air parameters in an air conditioned space, and more particularly to an economizer control system for regulating admission of outdoor air into the space both to supplement cooling provided by mechanical cooling equipment and to maintain indoor air quality.

BACKGROUND OF THE INVENTION

It is well known in systems for regulating temperature in an air conditioned space to use outside air to assist in maintaining the desired air temperature when the outdoor air conditions are suitable for that purpose. Suitability of the outside air for cooling depends on its enthalpy which is a function of both its temperature and humidity. Outside air is typically brought into the air conditioned space through economizer equipment.

Conventional economizer equipment provides significant economic benefits in many space cooling applications. However, it lacks flexibility in some situations. For example, it does not accommodate purposes other than cooling for admitting or limiting the admission of outdoor air. Under some circumstances, such as if indoor air quality falls below a quality standard, it may be desirable to admit more outdoor air than optimum for cooling purposes. Conversely, under other circumstances, such as if the outdoor air quality is poor or if the temperature of air entering the mechanical cooling equipment is too low, it may be desirable to limit the admission of outdoor air even though outdoor air could assist the cooling process.

To insure healthy and comfortable working or living conditions in large buildings, codes generally require that a minimum amount of fresh air be supplied to any such building during its occupancy. However, due to cost reduction measures, many building manufacturers have chosen to seal the building shell to reduce exfiltration of indoor air and resultant heat loss. These construction methods can result in buildings which are not adequately ventilated, with attendant degradation of indoor air quality. Although air quality may be deficient in a variety off respects, poor indoor air quality is often accompanied by an elevated carbon dioxide level.

Particularly, in northern climates, mechanical cooling may encounter problems if the temperature of admitted outdoor air approaches or drops below freezing. In such installations, many mechanical cooling systems employ preheat coils upstream from the cooling coils to provide for maintaining the air supplied to the cooling coils at a temperature above that which could cause the coils to freeze. Obviously, preheating air supplied to the cooling coils in preparation for cooling the air has an adverse impact on energy efficiency.

The applicant has devised several improvements for economizer controls which offer substantially increased operational flexibility. Among other things, the applicant's system provides for coordinated regulation of temperature and non-temperature air parameters to ensure optimum indoor air conditions, while protecting sensitive and costly equipment, and achieving operating efficiency.

SUMMARY OF THE INVENTION

The present invention is a control system for economizer apparatus including mechanical cooling equipment, ventilating equipment and economizer logic which, when cooling is called for, admits outdoor air to supplement cooling provided by the mechanical cooling equipment if the outdoor air is suitable for cooling. The control system includes air temperature apparatus for producing an air temperature control signal if conditions suitable for operation of the economizer are signaled, air quality apparatus for producing an air quality control signal, and logic for receiving the air temperature and air quality control signals, and operable to produce a ventilating equipment control signal based on which of the air temperature and air quality control signals corresponds to admission of the larger amount of outdoor air. The air quality apparatus may include an indoor air quality sensor, which may sense carbon dioxide concentration.

The control system may also include a freeze protection circuit which responds to the temperature of air entering the mechanical cooling equipment, and signals the economizer to reduce the admission of outdoor air if the temperature of the air entering the mechanical cooling equipment falls below a predetermined temperature. The control system may also include means for modifying control signals supplied to the economizer to provide for maximum and minimum economizer damper positions, and to substitute economizer operation for first stage cooling operation in a system with two stages of mechanical cooling.

BRIEF DESCRIPTION OF THE DRAWINGS

FIG. 3 is a table illustrating various combinations of input terminal states, and the corresponding output conditions provided by the economizer logic module of FIGS. 2A and 2B.

DESCRIPTION OF THE PREFERRED EMBODIMENT

In the following detailed description, references are made to the accompanying drawings which form a part hereof, an in which is shown by way of illustration specific embodiments in which the invention may be practiced. These embodiments are described in sufficient detail to enable those skilled in the art to practice and use the invention. It is to be understood that other embodiments may be utilized, and that electrical, logical, and structural changes may be made without departing from the spirit and scope of the present invention. The following detailed description is, therefore, not to be taken in a limiting sense. The scope of the present invention is defined by the appended claims and their equivalents.

Figure 1:
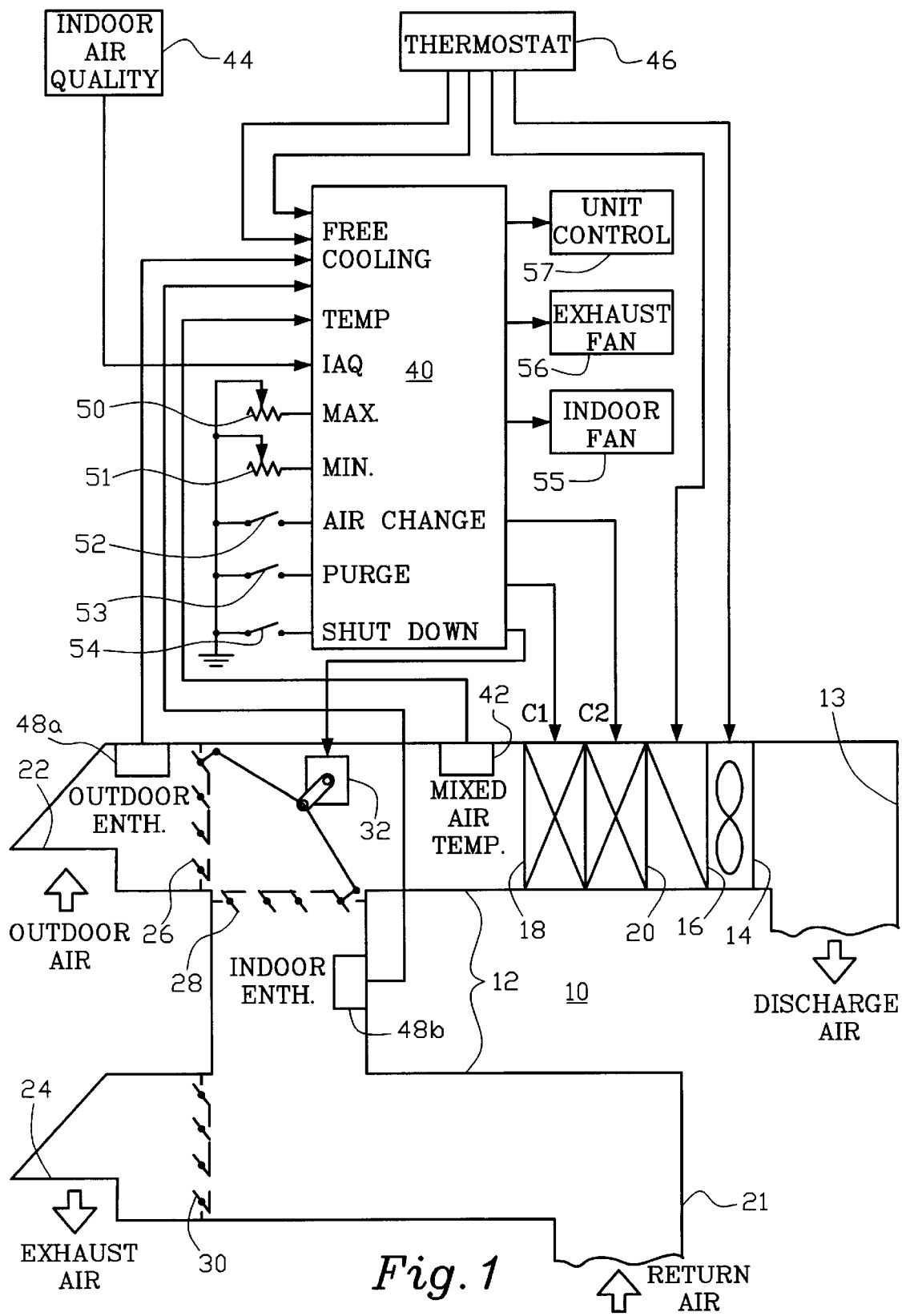
FIG. 1 illustrates, in block diagram form, apparatus, including an economizer system in accordance with the applicant's invention for conditioning air within an enclosed space.

In FIG. 1, reference 10 generally identifies apparatus for conditioning air within an enclosed space, the apparatus including a duct system 12 for supplying conditioned air to and exhausting air from the space. A supply duct 13 is shown housing a fan or blower 14 for circulating air through duct system 12 and the enclosed space, a heating heat exchanger 16, and cooling coils 18 and 20 for first and second stage mechanical cooling equipment respectively.

Duct system 12 is configured so that supply duct 13 receives air in varying proportions from a return air duct 21 through which air is removed from the enclosed space, as well as, outdoor air through an outdoor air intake 22. Return air duct 21 is fitted with an exhaust air outlet 24 through which stale air is exhausted from the enclosed space and duct system. The proportions of fresh and recirculated air taken into supply duct 13, as well as the amount of air exhausted from return air duct 21 are controlled by intake damper 26, recirculation damper 28 and exhaust damper 30. The positions of dampers 26 and 28 are shown controlled by an actuator 32 through a linkage arrangement which provides for opening of damper 26 as damper 28 closes and opening of damper 28 as damper 26 closes.

Actuator 32 is controlled by an economizer logic module 40, which also controls the operation of the first and second stages of mechanical cooling in response to various sensed parameters which may be reflected in signals from a mixed air temperature sensor 42, an indoor air quality sensor 44, a thermostat 46, an outdoor enthalpy sensor 48a and an indoor enthalpy sensor 48b. In addition, economizer logic module 40 is shown having terminals for receiving input signals from a maximum limit input device 50, a minimum limit input device 51 and air change, purge and shut down switches 52, 53 and 54 respectively. Various combinations of the states of switches 52, 53 and 54 cause economizer logic module 40 to produce various combinations of output signals for controlling auxiliary equipment, such as an indoor fan 55, an exhaust fan 56 and a unit control 57 suitable for controlling any of various additional auxiliary units.

Air conditioning apparatus 10 may be considered as having four general states of operation. First, if no ventilation is necessary in the enclosed space, such as during a nightly shutdown period, intake damper 26 is closed, and recirculation damper 28 is correspondingly fully opened. Second, when the space is to be occupied and ventilation is needed, but no cooling is required, module 40 causes actuator 32 to open damper 26 to a minimum open position. Third, if there is a call for cooling from thermostat 46 and the outdoor air is suitable for cooling purposes, module 40 causes actuator 32 to modulate damper 26 between minimum and maximum open positions. Fourth, if indoor air quality sensor 44 indicates a need for admission of outdoor air to improve indoor air quality, module 40 causes actuator 32 to modulate the position of damper 26 regardless of whether cooling is called for and regardless of outdoor air enthalpy.

Figure 2A:
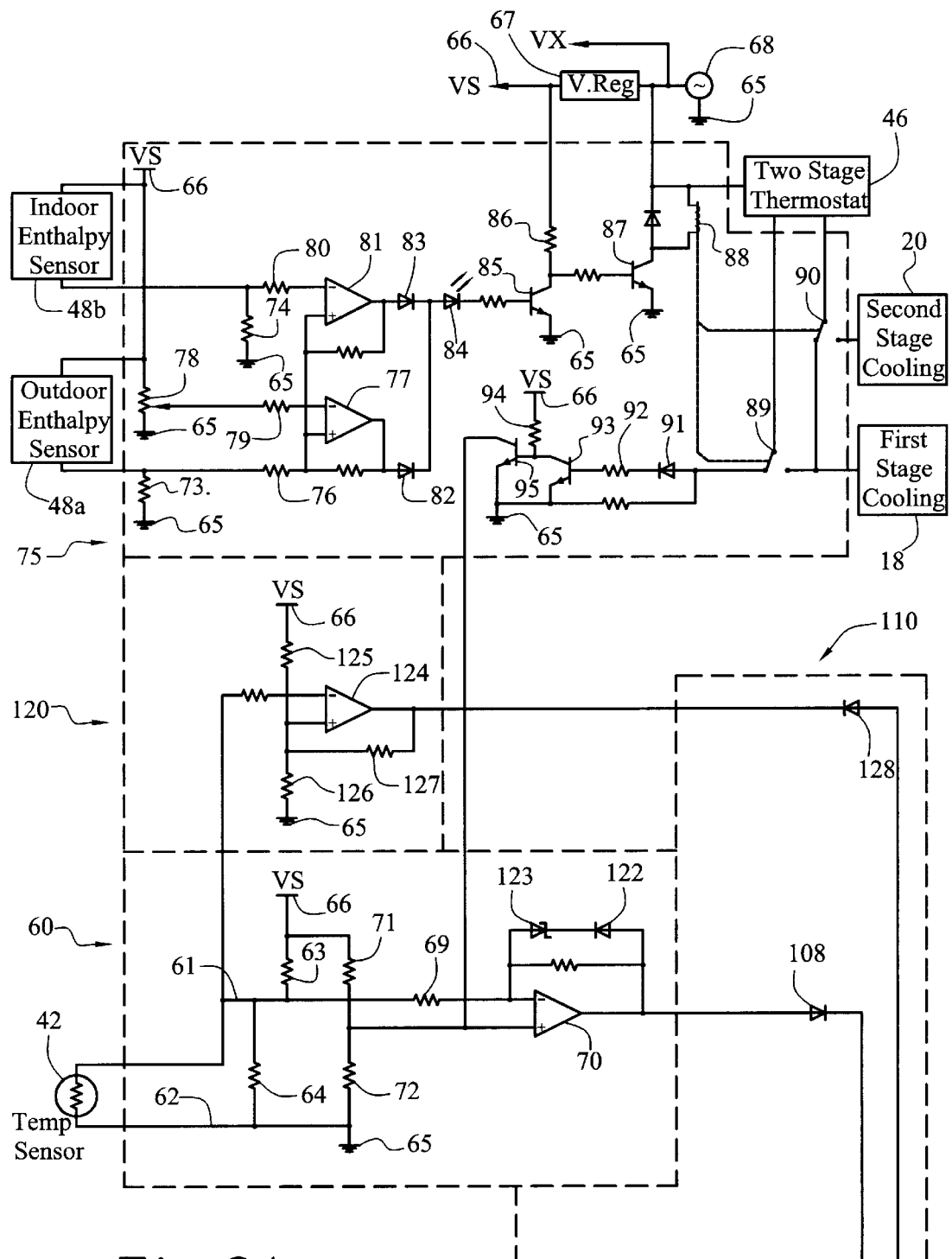
FIGS. 2A–2C together show, in electrical circuit schematic form, an economizer logic module with enhanced functionality for use in the apparatus of FIG. 1.
Figure 2B:
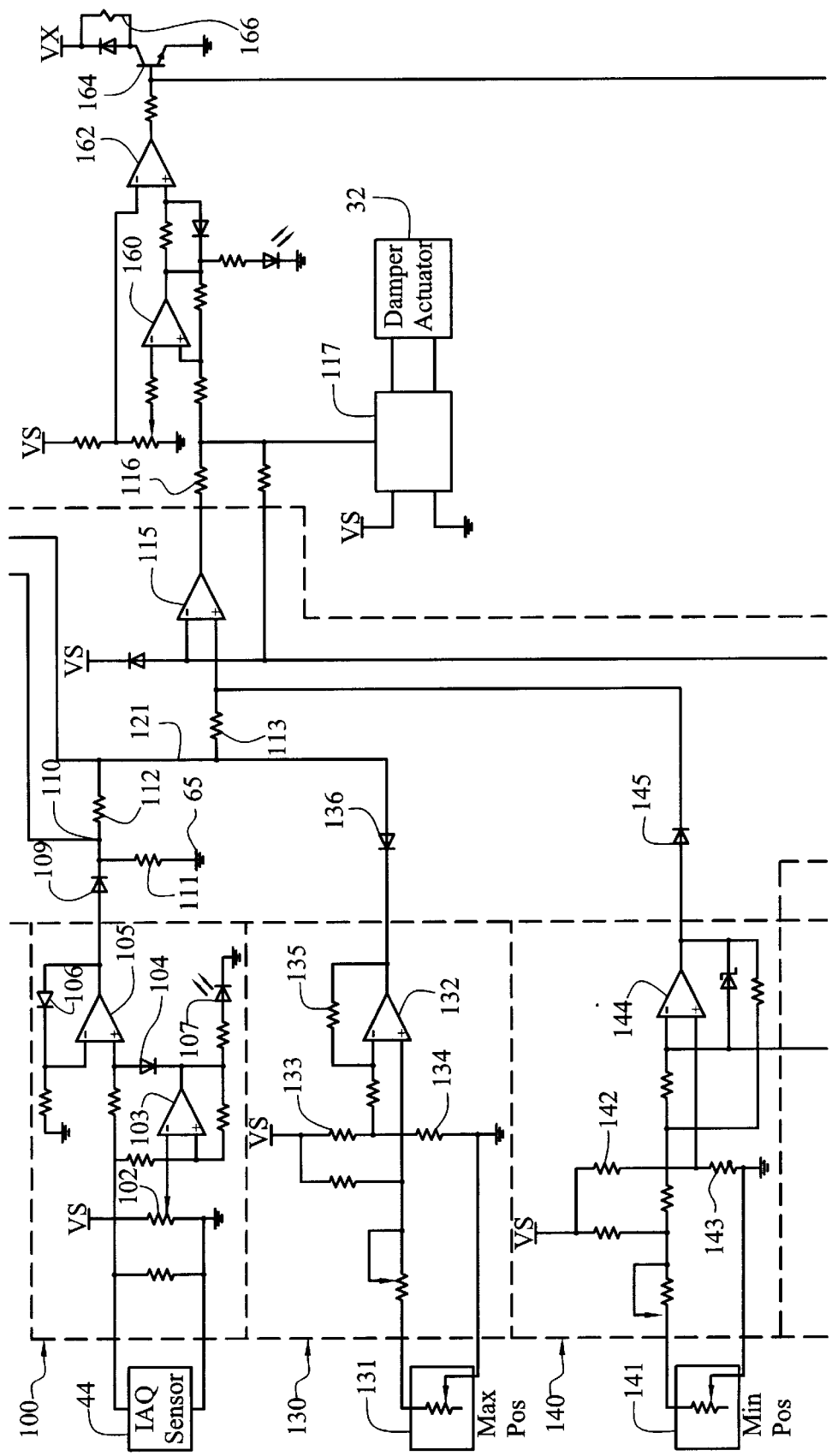
Figure 2C:
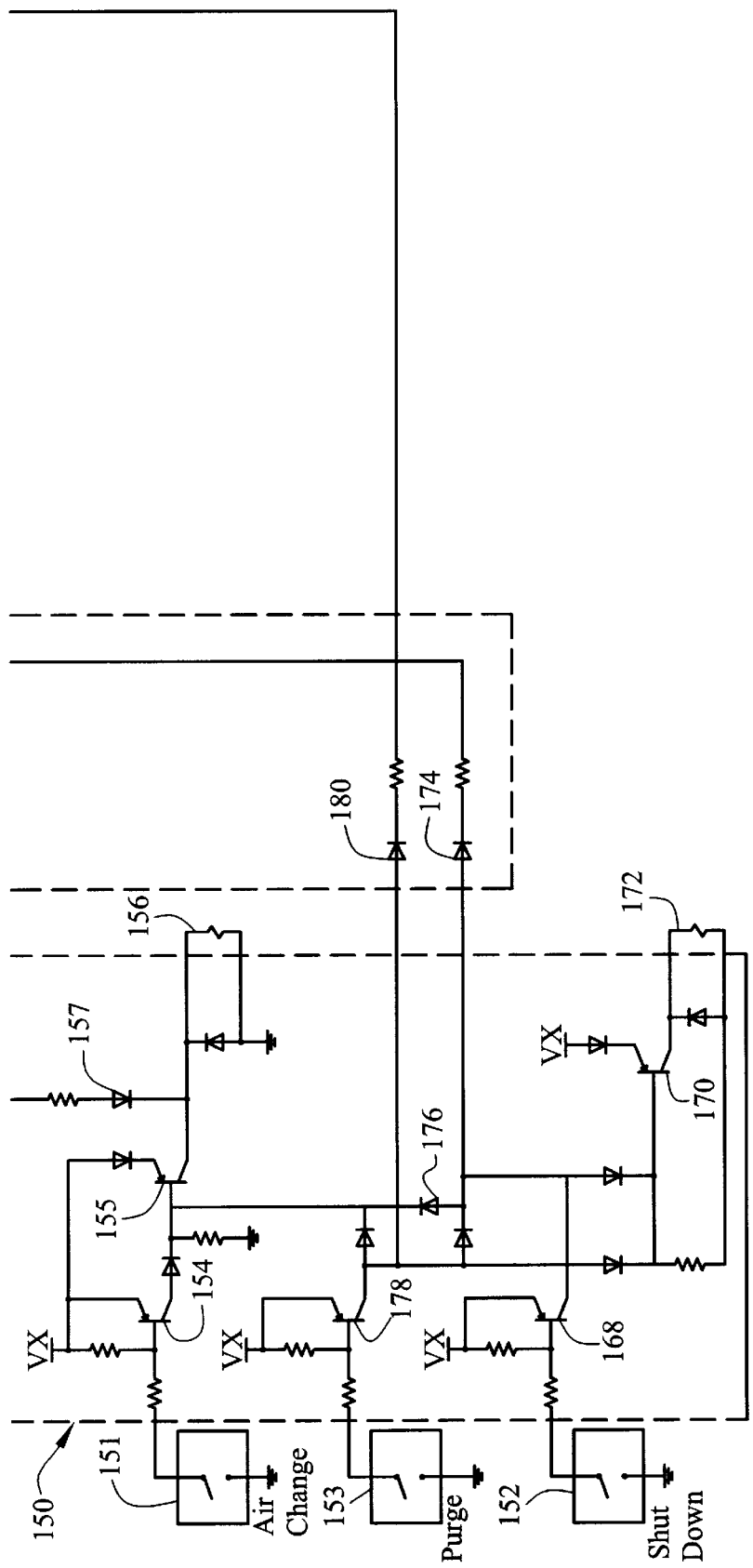

Turning to the electrical circuit schematic of FIGS. 2A and 2B, reference numeral 60 identifies an air temperature circuit or apparatus which, when enabled as hereinafter described, produces a control signal for modulating the position of damper 26 (and damper 28) between minimum and maximum position limits. Circuit 60 has input terminals 61 and 62 across which mixed air temperature sensor 42 is connected. In the implementation shown, sensor 42 is a thermistor having a negative temperature coefficient. Terminal 61 is the center tap of a voltage divider comprising resistors 63 and 64 connected between a source of circuit reference potential or ground 65 and the source of circuit supply potential 66 produced by a voltage regulator 67 which receives electric current from an alternating current source 68, preferably at a voltage of 24 volts AC. Voltage regulator 67 also supplies operating current at the circuit supply potential to various other portions of economizer logic module 40, as will be referred to hereinafter.

The input signal to circuit 60 is a temperature dependent voltage supplied through a resistor 69 to the inverting input terminal of an operational amplifier 70, the non-inverting input terminal of which is normally maintained at a predetermined voltage by means of its connection to the center tap of a voltage divider comprising resistors 71 and 72 connected between supply source 66 and ground 65. The voltage supplied to the non-inverting input terminal of amplifier 70 through divider 71/72 represents a reference temperature against which that temperature sensed by temperature sensor 42 is compared to control the position of damper 26, provided there is a call for cooling by thermostat 46, and provided the outdoor air has sufficiently low enthalpy to be suitable for cooling.

In the illustrated embodiment, suitability of the outdoor air for cooling is determined by whether enthalpy of the outdoor air is either lower than a predetermined threshold or lower than enthalpy of the indoor air being recirculated through the enclosed space and duct system. Outdoor enthalpy and indoor enthalpy are sensed by enthalpy sensors 48a and 48b respectively. Enthalpy sensors 48a and 48b may be Model C4700 enthalpy sensors available from Honeywell Inc., which comprise enthalpy sensitive variable resistance devices. Sensors 48a and 48b are connected in series with resistors 73 and 74 respectively, between supply source 66 and ground 65, and, in a typical installation, provide a 4 to 20 milliamp (mA) output which varies directly with the sensed enthalpy.

The output signals of enthalpy sensors 48a and 48b are supplied to an enabling circuit 75 which functions to enable the use of "free cooling" under suitable outdoor enthalpy conditions. In particular, the output signal of outdoor enthalpy sensor 48a, which appears at the junction between the sensor and resistor 73 is supplied through a resistor 76 to the non-inverting input terminal of an operational amplifier 77 biased for switching operation. The inverting input terminal of amplifier 77 receives a signal from a potentiometer 78 through which an enthalpy threshold for free cooling can be set. The signal from the wiper of potentiometer 78 is supplied through a resistor 79 to the inverting input terminal of amplifier 77 which produces a "high" output signal if the sensed outdoor enthalpy is lower than the enthalpy threshold setpoint.

The output signal of indoor enthalpy sensor 48b is supplied through a resistor 80 to the inverting input terminal of an operational amplifier 81, which is also biased for switching operation. The non-inverting input terminal of amplifier 81 is supplied with the output signal of outdoor enthalpy sensor 48a. Amplifier 81 produces a high output signal only if the sensed outdoor enthalpy is lower than the sensed indoor enthalpy.

The output signals of amplifiers 77 and 81 are supplied through diodes 82 and 83 respectively, which serve to pass a high signal if the sensed outdoor enthalpy is lower than either the enthalpy setpoint or the sensed indoor enthalpy. A high signal indicating suitably low outdoor enthalpy results in illumination of a light emitting diode (LED) 84, indicating availability of free cooling. A high output signal from amplifier 77 or 81 also produces a high signal on the base electrode of an NPN transistor 85 whose collector electrode is connected to circuit supply 66 through a resistor 86, and whose emitter electrode is connected to ground 65. A high signal on the base of transistor 85 causes the transistor to conduct, thus bringing its collector to a low state. The signal on the collector of transistor 85 is supplied to the base electrode of an NPN transistor 87 which, through its collector and emitter electrodes, is connected in series with the coil 88 of a double-pole double-throw relay (shown in unactuated state) between AC source 68 and ground 65. The poles 89 and 90 of the relay are connected to the first and second stage cooling outputs of thermostat 46. When the relay is actuated, the first and second stage cooling outputs are connected to provide control signals to the first and second stages of mechanical cooling apparatus, of which coils 18 and 20 are a part. However, if the outdoor enthalpy is suitable for providing free cooling, thereby de-energizing the relay, the first stage cooling output of thermostat 46 is connected to a subcircuit which removes a disabling signal from air temperature circuit 60, and causes the second stage cooling output from thermostat 46 to be supplied as the control signal for the first stage of mechanical cooling, the second stage of mechanical cooling being disconnected from any control signal.

Removal of the disabling signal from air temperature circuit 60 in response to availability of free cooling is accomplished as follows. A high signal on the first stage cooling output terminal of thermostat 46 is supplied through pole 89 of the relay, a diode 91 and a resistor 92 to the base electrode of an NPN transistor 93 whose collector is biased high by connection through a resistor 94 to supply source 66. The collector of transistor 93 is connected to the base electrode of an NPN transistor 95 whose emitter is connected to ground 65 and whose collector is connected to the non-inverting input terminal of amplifier 70 in air temperature circuit 60. Thus, if the sensed outdoor enthalpy is sufficiently low to provide free cooling and thermostat 46 is calling for cooling, transistor 93 is caused to conduct, thus rendering transistor 95 non-conductive, and allowing the signal provided by voltage divider 71/72 in air temperature circuit 60 to be supplied to the non-inverting input terminal of amplifier 70. Under all other conditions, transistor 95 is conductive and its collector is at a low signal level, which low level lowers the bias provided by voltage divider 71/72 to amplifier 70 and prevents amplifier 70 from permitting the mixed air temperature signal to control the position of damper 26.

Reference numeral 100 identifies an indoor air quality circuit which receives an indoor air quality signal from sensor 44, which senses a parameter indicative of the quality of the air in the air conditioned space. Sensor 44 may be a Model 7242 carbon dioxide sensor available from Honeywell Inc. A high signal from sensor 44 is indicative of poor air quality. The input signal from sensor 44 is first compared with a variable set point signal produced by a potentiometer 102. When the indoor air quality signal is lower than the set point signal, an operational amplifier 103 produces a low output signal, forward biasing a diode 104 and clamping the output of amplifier 103 to a low state. This prevents the indoor air quality signal from proceeding any further. However, when the indoor air quality signal exceeds the set point signal, operational amplifier 103 produces a high output signal, reverse biasing diode 104 and allowing the signal to proceed through a voltage follower operational amplifier 105 having its inverting input terminal biased to ground potential, and having a diode 106 connected in a negative feedback path around the amplifier. A high output of operational amplifier 103 will also cause a LED 107 to illuminate, indicating that the indoor air quality is below the specified set point.

The output signals of air temperature circuit 60 and indoor air quality circuit 100, as well as the output signals of other circuits to be described hereinafter, are supplied to a signal processor 110 shown as comprising an array of diodes and associated biasing and buffering resistors. Processor 110 functions to establish which of the signals from the various circuits controls the position of damper 26 at any given time. With specific reference to mixed air temperature and indoor air quality, the output signals of circuits 60 and 100 are supplied to the anodes of diodes 108 and 109 respectively. The cathodes of these diodes are connected at a junction 118 which is biased to ground potential by connection to ground 65 through a resistor 111.

The signal at junction 118, which comprises the larger of the signals produced by circuits 60 and 100, is supplied through buffering resistors 112 and 113 to the non-inverting input terminal of an operational amplifier 115 whose output signal is supplied through a resistor 116 as the input signal to a controller 117 for actuator 32.

Also associated with air temperature circuit 60 is a freeze protection circuit 120, which is connected to receive the output signal of mixed air temperature sensor 42. If the mixed air temperature drops to a minimum predetermined level, the output signal of freeze protection circuit 120 will be low and will override the signal at junction 118 by clamping the signal at a junction 121 between buffering resistors 112 and 113 to a low state, which closes damper 26 to a minimum position to protect cooling coils 18 and 20 and other equipment vulnerable to low temperature. Freeze protection circuit 120 includes several components associated with air temperature circuit 60. A diode 123 (a 10V Zener diode in one actual circuit embodiment) prevents the output voltage of amplifier 70 from rising too high. A diode 122 poled oppositely of diode 123 is provided to prevent a low output of amplifier 70 from influencing the non-inverting input of the amplifier.

A rise in output voltage from sensor 42 is detected by an operational amplifier 124, voltage divider resistors 125 and 126, and positive feedback resistor 127. These resistors are chosen such that when the temperature sensed by mixed air temperature sensor 42 drops to a minimum set temperature, the output of operational amplifier 124 switches to a low state. The output stays low until the temperature sensed by sensor 42 rises to above the minimum set temperature, at which time the output of operational amplifier 124 switches high, thereby reverse biasing a diode 128 between the output of amplifier 124 and junction 121.

Reference numeral 130 identifies a maximum limit circuit which functions to provide a maximum limit position for damper 26, and may be used in hot or humid climates during the summer or in cold climates during the winter to limit the amount of outside air admitted. A typical setting is approximately 70% open. This circuit uses a potentiometer 131 as the input source. Similar to previously described circuits, circuit 130 includes an operational amplifier 132, voltage divider resistors 133 and 134 and a feedback resistor 135. This circuit is constructed such that at a low or zero input resistance, the maximum position of damper 26 is fully open. At a higher input resistance, the output signal of this circuit passes through a diode 136 whose anode is connected to junction 121, and establishes a maximum level for the signal appearing at the junction.

Reference numeral 140 identifies a minimum limit circuit. This circuit establishes a minimum position limit for damper 26 at all times. The function of this control is to ensure proper ventilation in the enclosed space, consistent with minimum ventilation requirements based on building occupancy. The input signal to the circuit is provided by a potentiometer 141. The circuit comprises voltage divider resistors 142 and 143, and an operational amplifier 144 similar to those described above. Minimum limit circuit 140 is designed such that at a high input resistance, the output signal of operational amplifier 144 allows the damper 26 to have a minimum position of full closed. At a lower input resistance, the output of operational amplifier 144 passes through a diode 145 whose cathode is connected to the non-inverting input terminal of operational amplifier 115 and establishes a minimum level. Circuit 140 overrides the maximum limit circuit 130.

The applicant's enhanced economizer also provides that if an air change is desired within the air conditioned space, a portion of an override circuit 150 may be activated by an air change switch 151. This feature is useful to drive damper 26 fully open while starting the indoor and exhaust fans (not shown) to quickly pull fresh air into a building. This feature might be used when occupancy is very high or in some emergency condition, such as heavy smoke, has occurred. This portion of circuit 150 functions to set the minimum position of circuit 140 to full open.

When the contacts of switch 151, as well as the contacts of a shutdown switch 152 and a purge switch 153 are open, a transistor 154 is in a non-conducting state, while a transistor 155 is in a conducting state, thereby energizing a unit control relay 156. While the contacts of switch 151 are open, a diode 157 is reverse biased, allowing minimum limit circuit 140 to function normally. However, when the switch 151 contacts are closed commanding an air change, transistor 154 becomes conducting while transistor 155 becomes non-conducting. Unit control relay 156 is thus no longer energized, and diode 157 pulls the inverting input of minimum position operational amplifier 144 to a low state. This forward biases diode 145 and causes a maximum output signal from amplifier 115 which drives damper 26 to its fully open position. It further causes high outputs from amplifiers 160 and 162, and causes conduction of an NPN transistor 164, which energizes an exhaust fan relay 166.

Should the user desire system shutdown, a second portion of override circuit 150 may be activated through shutdown switch 152. System shutdown fully closes the damper 26 by providing a high signal through diode 174 to the inverting input of amplifier 115 to shut down all fans and other system controlled devices. A typical use of the shutdown function would be to prevent fresh air from circulating when a fire is present within the enclosed space.

With purge switch 153 contacts and shutdown switch 152 contacts in an open state, a transistor 168 is in a non-conducting state, a transistor 170 is conducting, and an indoor fan relay 172 is energized. A diode 174 is reverse biased, thereby preventing any affect on operational amplifier 115. When the shutdown switch 152 contacts are closed, transistors 168 and 170 change states and the indoor fan relay 172 is de-energized. A diode 176 is also forward biased, overriding the air change signal and de-energizing the unit control relay 156.

Similarly, when purge switch 153 contacts are open, a transistor 178 is in a non-conducting, state, and this portion of override circuit 150 has no effect on the other portions of the circuit. If the purge circuit is used, damper 26 is closed and the indoor fans are deactivated, while the exhaust fan is activated. Purge switch 153 is commonly used in a situation where there may be a small nuisance fire, and the smoke needs to be exhausted without allowing fresh air into the enclosed space. Conversely, when purge switch 153 contacts are closed, transistor 178 is conductive, causing the same effect as when shutdown switch 152 contacts are closed. In addition, a diode 180 is forward biased, energizing exhaust fan relay 166.

The previously described and other operational states resulting from various combinations of switch states may be seen in the table of FIG. 3.

In accordance with the foregoing discussion, the applicant has provided a unique enhanced economizer control system which offers maximum flexibility in air conditioning system control. Although a specific example of the applicant's enhanced economizer control system has been shown and described for illustrative purposes, a number of variations and modifications within the applicant's contemplation and teaching will be apparent to those skilled in the relevant arts. It is not intended that coverage of the invention be limited to the embodiment disclosed, but only by the terms of the following claims.

What is claimed is:

1. A controller for controlling mechanical cooling equipment and ventilating equipment for conditioning air within an enclosed space in response to signals indicative of air temperature and of at least one non-temperature air parameter respectively, the ventilating equipment being responsive to a ventilating equipment control signal to exchange a variable proportion of air within the space for air outside the space, the controller comprising:

economizer control apparatus operable in response to a space thermostat signal indicating that a temperature in the enclosed space is above a setpoint temperature, and an enthalpy sensor signal indicating that air outside the enclosed space is suitable for providing cooling within the space, to produce mechanical cooling equipment control signals, said economizer control apparatus further being operable to produce an economizer control signal;

air temperature apparatus connected to receive the economizer control signal and operable, at least partially dependent on the economizer control signal, to produce an air temperature control signal representative of a commanded temperature change of air entering the space;

air quality apparatus operable to produce an air quality control signal representative of a commanded change in a non-temperature parameter of air within the space; and a signal processor connected to receive the air temperature and air quality control signals, and operable to produce a ventilating equipment control signal based on the one of the air temperature control signal, and air quality control signal which corresponds to the greater exchange of air within the space for air outside the space, the ventilating equipment control signal being suitable for causing ventilating equipment receiving the ventilating equipment control signal to increase the proportion of air within the enclosed space exchanged for air outside the space at least in part in response to the space thermostat and enthalpy sensor signals.

2. The controller of claim 1 wherein the non-temperature parameter is air composition.

3. The controller of claim 2 wherein the non-temperature parameter is carbon dioxide concentration.

4. The controller of claim 1 wherein:

the air temperature control signal has a magnitude indicative of the difference between sensed and reference temperatures of air entering the enclosed space;

the air quality control signal has a magnitude indicative of the difference between sensed and reference values of the non-temperature parameter of air within the enclosed space; and said signal processor includes logic circuitry operable to select the one of the air temperature control and air quality control signals which corresponds to the greater exchange of air within the space for air outside the space, and to produce a signal at least partially dependent on the selected signal as the ventilating equipment control signal.

5. The controller of claim 4 wherein:

said air temperature apparatus includes an air temperature sensor for producing a signal whose magnitude is indicative of the temperature of air entering the enclosed space;

a freeze protection circuit is provided, said freeze protection circuit being connected to receive the signal produced by said air temperature sensor, and operable to produce a freeze protection signal when the temperature of air entering the enclosed space is below a predetermined value; and the logic circuitry in said signal processor is connected to receive the freeze protection signal, and is operable to alter the ventilating equipment control signal to a value effective to limit exchange of air within the space for air outside the space to a proportion no greater than that corresponding to the freeze protection signal.

6. The controller of claim 5 wherein:

a maximum limit input device is provided, said maximum limit input device being operable to produce a maximum ventilation signal whose magnitude is indicative of the maximum proportion of air within the enclosed space to be exchanged for air outside the space; and the logic circuitry in said signal processor is connected to receive the maximum ventilation signal, and is operable to alter the ventilating equipment control signal to a value effective to limit exchange of air within the space exchanged for air outside the space to a proportion no greater than the corresponding to the maximum ventilation signal.

7. The controller of claim 6 wherein:

a minimum limit input device is provided, said minimum limit input device being operable to produce a minimum ventilation signal indicative of the minimum proportion of air within the enclosed space to be exchanged for air outside the space; and the logic circuitry in said signal processor is connected to receive the minimum ventilation signal, and is operable to substitute the minimum ventilation signal for the ventilating equipment control signal if the third ventilating equipment control signal corresponds to exchange of a smaller proportion of air within the space than the proportion corresponding to the minimum ventilation signal.

8. The controller of claim 7 wherein said economizer control apparatus is operable to provide first and second cooling stage control signals for first and second stages of mechanical cooling equipment respectively in response to signals received from a two-stage thermostat and from enthalpy sensor apparatus, said economizer control apparatus being operable to disable the second stage mechanical cooling equipment and to provide the second cooling stage control signal as a control signal for the first stage mechanical cooling equipment when the enthalpy sensed by the enthalpy sensor apparatus indicates that the air outside the enclosed space is suitable for introduction into the enclosed space for cooling purposes, the signal from said economizer control apparatus further being operable to enable said air temperature apparatus to produce the air temperature control signal when the enthalpy sensed by the enthalpy sensor apparatus indicates that the air outside the enclosed space is suitable for introduction into the enclosed space for cooling purposes.

9. The controller of claim 8 wherein:

said enthalpy sensor apparatus includes first and second enthalpy sensors for sensing the enthalpies of air leaving the enclosed space and air outside the enclosed space respectively; and said economizer control apparatus is operable to produce an economizer signal for enabling the air temperature apparatus when the enthalpy of air outside the enclosed space is lower than both a reference value and enthalpy of air leaving the enclosed space.

10. In a system for conditioning the air in an enclosed space, the improvement which comprises:

temperature changing apparatus including mechanical cooling equipment, ventilating equipment operable to exchange a variable proportion of the air within the enclosed space for air outside the space, and a ventilating equipment actuator responsive to an actuator control signal to determine the proportion of air within the space exchanged for air outside the space;

air temperature apparatus operable to produce an air temperature control signal representative of a commanded change in temperature of air entering the space;

a space thermostat operable to sense whether temperature within the enclosed space is above a setpoint temperature, and to supply a corresponding call for cooling signal to said temperature changing apparatus;

enthalpy sensor apparatus operable to sense whether air outside the enclosed space is suitable for providing cooling within the space and to supply a corresponding low enthalpy signal to said air temperature apparatus, said air temperature apparatus being enabled to produce the actuator control signal in response to the call for cooling and low enthalpy signals, the actuator control signal being effective to cause the ventilating equipment actuator to increase proportion of air within the enclosed space exchanged for air outside the space at least in part in response to a call for cooling signal from said space thermostat and a low enthalpy signal from said enthalpy sensor apparatus;

air quality apparatus operable to produce an air quality control signal representative of a commanded change in a non-temperature parameter of air within the space; and a signal processor connected to receive the air temperature control and air quality control signal, and operable to supply the actuator control signal to the ventilating equipment actuator, said signal processor generating the actuator control signal based at least in part on the relative magnitudes of the air temperature and air quality changes commanded by the air temperature control and air quality control signals respectively.

11. The system of claim 10 wherein said air temperature apparatus is enabled to produce the air temperature control signal by an enabling signal produced by the economizer control apparatus in response to call for cooling and low enthalpy signals provided by said space thermostat and said enthalpy sensor apparatus respectively, the actuator control signal being derived selectively from the air temperature control and air quality control signals.

12. The system of claim 11 wherein:

said air temperature apparatus includes an air temperature sensor operable to produce a signal indicative of the temperature of air entering the enclosed space;

a freeze protection circuit is provided, the freeze protection circuit being connected to receive the signal from said air temperature sensor, and operable in response thereto to produce a freeze protection signal when the air entering the enclosed space is below a predetermined temperature, the actuator control signal being affected by the freeze protection signal so as to limit exchange of air within the space for air outside the space to a proportion corresponding to the freeze protection signal.

13. The system of claim 12 further including a maximum ventilation input device operable to produce a maximum ventilation signal indicative of the maximum proportion of air within the space to be exchanged for air outside the space, the actuator control signal being affected by the maximum ventilation signal so as to limit exchange of air within the space for air outside the space to a proportion not greater than that corresponding to the maximum ventilation signal.

14. The system of claim 13 further including a minimum ventilation input device operable to produce a minimum ventilation signal indicative of the minimum proportion of air within the space to be exchanged for air outside the space, the actuator control signal being affected by the minimum ventilation signal so as to provide for exchange of air within the space for air outside the space at a proportion not less than that corresponding to the minimum ventilation signal.

15. The system of claim 14 wherein said non-temperature parameter of air within the enclosed space is air composition.

16. The system of claim 15 wherein said non-temperature parameter of air within the enclosed space is carbon dioxide concentration.

* * * * *